Feb. 15, 1966     G. R. CHAPMAN     3,235,102

SILO UNLOADER

Filed Feb. 5, 1965

INVENTOR

*George Roland Chapman*

BY *Munson H. Lane*

ATTORNEY

United States Patent Office 3,235,102
Patented Feb. 15, 1966

3,235,102
SILO UNLOADER
George Roland Chapman, Stafford Road, Palmyra, N.Y.
Filed Feb. 5, 1965, Ser. No. 430,677
5 Claims. (Cl. 214—17)

This application is a continuation-in-part of my copending application Serial No. 303,883 filed August 22, 1963.

The present invention relates to new and useful improvements in silage handling machines of the general type disclosed, for example, in my Patent No. 2,788,247 dated April 9, 1957, or No. 2,978,121 dated April 4, 1961, and in particular the invention concerns itself with improvements in the silage conveyor chain disclosed in the aforementioned copending application Serial No. 303,883. The conveyor chain in that application is provided with silage scoops having cutters mounted on one side thereof, so that when the chain is in motion, the silage is loosened, broken up, cut, or otherwise disintegrated by the cutters and is left free to be propelled by the scoops of the conveyor.

While this arrangement is generally satisfactory when used on most types of silage, some difficulties are encountered in handling a relatively new type of silage known as "haylage" which consists for most part of dried grass. As compared to ordinary silage, haylage is lighter in weight, not as finely cut and comes loose in sheets, causing conventional silage handling machines to become obstructed and inoperative.

It is, therefore, the principal object of the present invention to eliminate these difficulties so that a conveyor of the type disclosed in the aforementioned application Serial No. 303,883 may be effectively employed for handling haylage. This object is attained by enclosing the lower or "working" run of the conveyor chain with a channel-like track having a bottom wall and one open side, the silage scoops of the chain traveling through the track along the bottom wall thereof while the cutters of the scoops project through the open side to below the track. The cutters thus engage and break up the haylage below and at one side of the track, permitting the same to be picked up and propelled by the scoops inside the track, without the scoops coming into contact with unbroken haylage.

Other objects and features of the invention may become apparent from the following description taken in conjunction with the accompanying drawings, wherein like characters of reference are used to designate like parts, and wherein.

Figure 1:
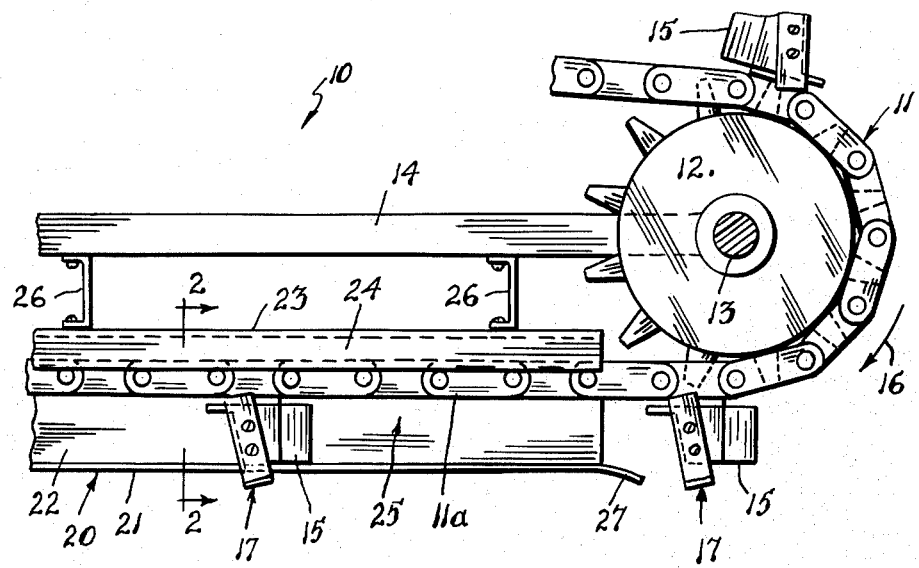
FIGURE 1 is a fragmentary side elevational view of the improved conveyor.

Referring now to the accompanying drawings in detail, the general reference numeral 10 designates a chain conveyor of a silage or haylage handling machine of the general type shown in my aforementioned Patents No. 2,788,247 and 2,978,121. The conveyor includes an endless chain 11 passing around sprockets one of which shown at 12 is carried by a shaft 13 suitably journalled in the machine frame 14. As disclosed in my aforementioned application Serial No. 303,883, the chain 11 is provided at spaced points with silage scoops 15 which have an open front facing the direction of travel 16 of the chain and they also have an open bottom in terms of their orientation at the underside of the lower or "working" run 11a of the chain, as will be clearly understood. Silage cutters 17 are secured to one side of the scoops 15, each cutter having a vertical knife portion 18 and a transverse knife portion 19 which projects laterally outwardly from the lower end of the portion 18, the transverse portion 19 being disposed below the open bottom of the scoop, as shown.

Figure 2:
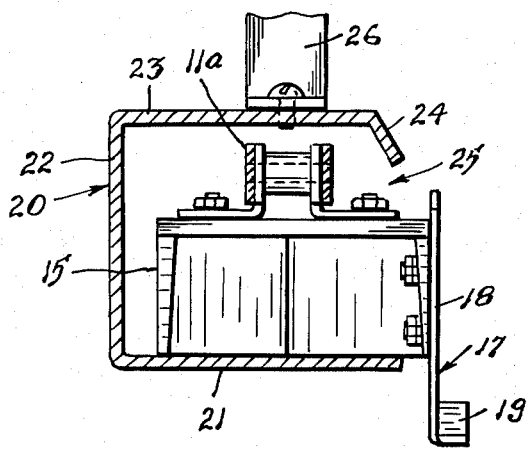
FIGURE 2 is an enlarged, fragmentary sectional view, taken substantially in the plane of the line 2—2 in FIGURE 1.

The present invention involves the provision of a channel-like track 20 which encloses the lower or "working" run 11a of the chain. The track 20 has a bottom wall 21, one side wall 22, and a top wall 23 with a downturned flange 24 at the other side of the track which is open, as at 25. The entire track 20 is suitably supported from the machine frame 14, as by the brackets 26 and the lower run 11a of the chain passes through the track with the bottom edges of the scoops 15 sliding along the bottom wall 21 of the track, as will be apparent from FIG. 2. As will be also apparent from FIG. 2, the scoops project slightly through the open side 25 of the track so that the cutters 17 are disposed at the outside of the track, with the knife portions 19 of the cutters located well below the track bottom wall 21. At the end of the track which is entered by the conveyor chain, the bottom wall 21 of the track may be equipped with a downturned lip 27 to easily guide the scoops 15 into the track at that point.

In operation, the chain 11 is driven in the direction 16 and, with the bottom wall 21 of the track 20 resting on top of the haylage, the scoops 15 are prevented from coming into direct contact with the haylage, so the latter is not torn up in sheets such as would cause obstruction of the conveyor. The downwardly projecting cutters 17 clear a path into which the track 20 laterally enters as the machine turns horizontally over the haylage, and the haylage broken up by the cutter on each scoop is picked up by the following scoop and propelled through the track. The track effectively minimizes the possibility of the picked up material from being lost out of the scoops during their travel, and it also prevents large chunks or sheets of haylage from entering the scoops. Also, since the bottom wall 21 of the track 20 rests on top of the haylage, the scoops 15 cannot sink into or freeze in the haylage when the apparatus is not in use, so it is easy to start movement of the conveyor when so desired. In addition, the resting of the track on top of the haylage provides a depth control, so to speak, in terms of the extent that the cutters 17 may enter the haylage, whereby overloading of the machine is prevented.

While in the foregoing there has been shown and described the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a silage handling machine, the combination of a conveyor chain, silage scoops secured to and depending from said chain, said scoops having sides and an open front facing the direction of travel of the chain, silage cutters secured exteriorly to one side of said scoops and projecting below the same, and a channel-like track enclosing said chain and having said scoops passing therethrough, said track having one open side and a bottom wall adapted to rest on silage, said scoops being slidable along said bottom wall within the track and said cutters projecting below said bottom wall at the open side of the track to engage the silage.

2. The device as defined in claim 1 wherein side portions of said scoops carrying said cutters project laterally outwardly through the open side of said track.

3. The device as defined in claim 1 wherein each of said cutters includes a vertical knife portion secured to the side of the associated scoop, and a transverse knife portion at the lower end of said vertical knife portion, said transverse knife portion being disposed below said bottom wall of said track.

4. The device as defined in claim 3 wherein said transverse knife portion of said cutters is inclined rearwardly in the direction of travel of said chain.

5. The device as defined in claim 3 wherein said transverse knife portion of each cutter projects laterally outwardly from the lower end of the associated vertical knife portion.

References Cited by the Examiner

UNITED STATES PATENTS

| | | | |
|---|---|---|---|
| 866,519 | 9/1907 | Rhodes et. al. | 198—174 X |
| 1,265,131 | 5/1918 | Stamp | 198—174 X |
| 2,480,656 | 8/1949 | Jenne. | |
| 3,057,608 | 10/1962 | Patz et. al. | 214—17 X |

HUGO O. SCHULZ, *Primary Examiner.*